United States Patent [19]

Kirkpatrick et al.

[11] Patent Number: 4,534,016
[45] Date of Patent: Aug. 6, 1985

[54] BEAM ADDRESSED MEMORY SYSTEM

[75] Inventors: Conilee G. Kirkpatrick, Thousand Oaks, Calif.; Michael S. Adler; George E. Possin, both of Schenectady, N.Y.

[73] Assignee: The United States of America as represented by the Secretary of the Air Force, Washington, D.C.

[21] Appl. No.: 512,070

[22] Filed: Jul. 8, 1983

[51] Int. Cl.³ .............................................. G11C 11/42
[52] U.S. Cl. ..................................... 365/128; 365/217
[58] Field of Search ............... 365/118, 128, 217, 237; 250/427; 350/395; 369/275, 288; 252/501.1

[56] References Cited

U.S. PATENT DOCUMENTS

| 3,885,076 | 5/1975 | Heidenreich et al. | 428/195 |
| 4,156,745 | 5/1979 | Hatzakis et al. | 427/43 |
| 4,450,553 | 5/1984 | Holster et al. | 369/275 |

OTHER PUBLICATIONS

C. G. Kirkpatrick, G. E. Possin, and J. F. Norton, "Information-Storage Device Using Surface Diodes", Applied Physics Letters, vol. 30, No. 11, pp. 592-594, (Jun., 1977).

W. J. Kleinfelder & R. R. Wilbarg, "Ion Bombardment to Change Physical Properties of Organic Polymers", IBM Technical Disclosure Bulletin, vol. 14, No. 10, p. 2899, (Mar. 1972).

C. G. Kirkpatrick, J. F. Norton, H. G. Parks and G. E. Possin, "New Concepts for Electron-Ion Beam and Electron-Electron Beam Memories", J. Voc. Sci. Technol., vol. 15, No. 3, pp. 841-844, (May/Jun. 1978).

Primary Examiner—James W. Moffitt
Attorney, Agent, or Firm—Donald J. Singer; Charles E. Bricker

[57] ABSTRACT

A beam-addressed memory system for digital memory recording and reading which comprises an electron beam generating and focusing subsystem, an electron detecting subsystem, electronic control and interface circuit means, and a storage medium consisting essentially of a cross-linkable polymeric film having an implanted surface layer of heavy metal ions.

8 Claims, 2 Drawing Figures

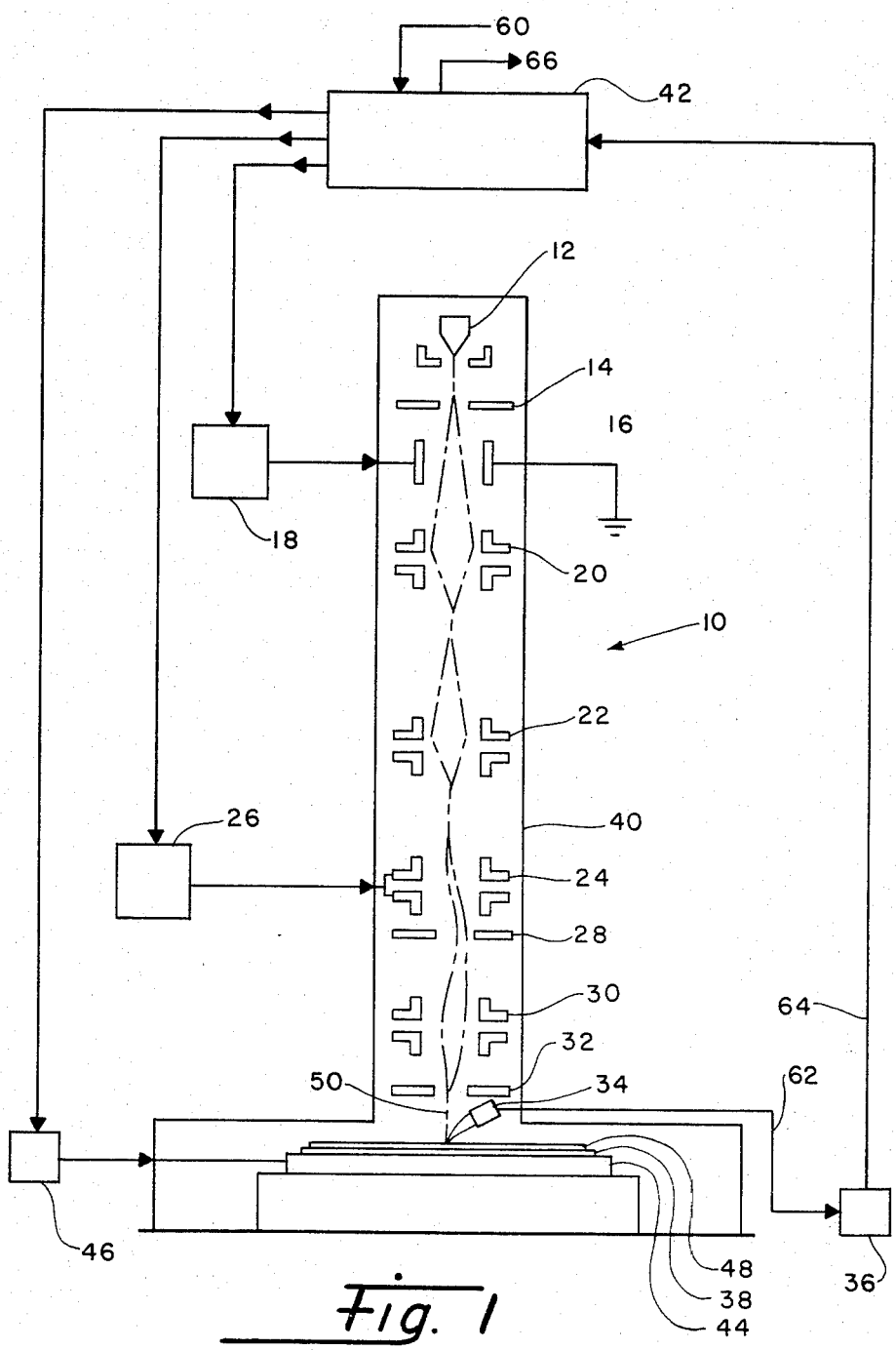
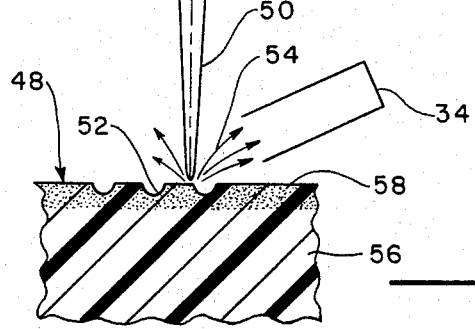
Fig. 1
Fig. 2

4,534,016

BEAM ADDRESSED MEMORY SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to computer data storage systems. It has been estimated that an oil company, for example, would need to store about $10^{15}$ bits of data, and that the magnetic tape currently used to store this quantity of data would occupy about 8 acres. It has also been estimated that U.S. Social Security, large banks and insurance companies need about $10^{14}$ bits of storage each, and satellite and U.S. Census Bureau applications require about $10^{13}$ bits each.

Aside from the problem of storing the magnetic tape required to store these quantities of data, there is the problem of accidental alteration or erasure of the data, and the problem that magnetic tape must be re-recorded at intervals of 6 months to 3 years to avoid data loss. Additionally, tape storage is limited by slow access times.

Beam addressed memories have the potential for solving these problems. Both electron and ion beams are attractive because of their ease of deflection, potentially small spot sizes, and appreciable energy density. Two of us have previously described, in J. Vac. Sci. Technol., 15(3), pp 841–844, May/June 1978, two concepts for particle beam memories which are written with focused ion or electron beams and read with an electron beam. The end result of both writing methods is to produce small damaged or doped regions near the surface of a semiconductor pn junction. The stores information is read with a 2.5-KeV electron beam. When the focused electron beam impinges on an unrecorded area, a signal current is generated in an external diode biasing circuit. When the beam impinges upon a written area the signal is reduced. With such recording schemes, bit spacings on the order of 0.1 micron become feasible at data rates on the order of 10 Mbits/sec. This would allow very large permanent memory stores, ranging from $10^{12}$ to $10^{15}$ bits with 100 microsec block access time. For example, one data plate with an active area of 10 cm$^2$ would equal the storage capacity of 400 rolls of magnetic tape; twenty such plates could house the files of the Social Security system.

We have found that a polymeric film implanted with heavy metal ions may be employed as the storage medium in a beam addressed memory system.

It is known to implant metal ions in a polymeric film. For example, IBM Technical Disclosure Bulletins, Vol. 14, No. 10, Mar. 1972 discloses that the temperature and corrosion resistance of cross-linkable polymer photoresist films are greatly increased by bombardment with high-energy ions.

It is an object of the present invention to provide a novel beam addressed memory system.

It is another object of this invention to provide a novel storage medium for a beam addressed memory system.

Other objects, aspects and advantages of the present invention will become apparent to those skilled in the art from a reading of the detailed disclosure and the appended claims.

SUMMARY OF THE INVENTION

In accordance with the present invention there is provided a beam addressed memory system for digital memory recording and reading which comprises an electron beam generating and focusing subsystem, an electron detecting subsystem, a data storage medium, means for positioning the storage medium, a vacuum chamber, and associated electronic control and interface circuit means, wherein the data storage medium consists essentially of a cross-linkable polymeric film having an implanted surface layer of heavy metal ions.

BRIEF DESCRIPTION OF THE DRAWINGS

In the drawings,

FIG. 1 is a schematic illustration of the beam addressed memory system of this invention; and FIG. 2 is an enlarged cross section of the storage medium illustrating electron bombardment and collection.

DETAILED DESCRIPTION OF THE DRAWING

The apparatus 10 shown in FIG. 1 is, essentially, a scanning electron microscope (SEM) which comprises an electron source 12, a primary aperture 14, a blanking condenser 16, a program pulse generator 18, a first condenser lens 20, a second condenser lens 22, deflection coils 24, deflection controller 26, aperture 28, final lens 30, final aperture 32, electron detector 34, amplifier 36, specimen holder 38, vacuum housing 40 and a central control unit 42. A moveable X,Y stage 44, controlled by an X,Y drive circuit 46, may be associated with specimen holder 38. A storage medium 48 is detachably mounted on the specimen holder 38.

Referring now to FIG. 2, the storage medium 48 is shown being bombarded with electrons in a focused beam 50. Data is stored in the medium 48 in the form of craters or pits 52, wherein the presence of a pit 52 indicates a data bit 1, and the absence of a pit 52 indicates a data bit 0, or vice versa. As the beam 50 is scanned across the storage medium 48, electrons, indicated by the arrows 54, are reflected from the medium 48. The reflection pattern of these electrons is dependent upon a number of factors including, for example, the direction and angle of incidence of the beam 50 relative to the detector 34, and the presence or absence of pits 52.

The storage medium 48 consists essentially of a thin film 56 of a polymeric material having an implanted surface layer of heavy metal ions, a few of which are indicated by the reference numeral 58. The film 56 is made from a polymeric material which can withstand bombardment at high levels of radiation. It is preferred to use a polymeric material which can undergo cross-linking at high radiation levels, such as, for example, polymethylmethacrylate.

The film 56 has an implanted surface layer of heavy metal ions 58. These heavy metal ions have a density, in the solid state, of at least 10 g/cc, preferably 15 g/cc or greater, and more preferably, above 19 g/cc. Suitable metals include Au, Pt, Ir, Os, W, Mo, and the like. The metal ions are implanted into the polymeric film in accordance with procedures well known in the art by bombarding the film using a flood or raster scanned ion beam over a period of several minutes or more. For an ion thickness between about 0.05 and 0.5 microns, an ion beam energy between about 40 and 400 KeV would be appropriate. The film 56 is implanted to fluences between about $10^{16}$ and $10^{17}$, preferably about $10^{17}$ ions/cm$^2$.

The use of the storage medium of this invention can be explained in greater detail by referring to FIG. 1. For recording, data to be recorded is supplied to the central control unit 42 through an input data bus 60. This data, which may be combined with appropriate control code, is transmitted from control unit 42 to the program pulse generator 18 which controls the blanking condenser 16, turning the beam 50 on when the data or control code is a logical one and turning the beam 50 off when the data or control code is a logical zero, or vice versa. The beam 50 is directionally controlled by the deflection controller 26 which provides directional signals to the deflection coils 24 in response to control signals from the central control unit 42. The data may be recorded onto the storage medium 48 row-by-row or in serpentine fashion. For recording, a beam energy of about 3-5 KeV is employed.

Inasmuch as the storage medium 48 may have a data storage area greater than the field accessed by the electron beam 50, the storage medium 48 is mounted upon the X,Y stage 44 by the specimen holder 38. Positioning of X,Y stage 44, with the specimen holder 38 and the storage medium 48 mounted thereon, is controlled by the X,Y drive circuit 46 in response to signals from the central control unit 42. Thus, when the field of the beam 50 has been filled with data, the X,Y storage repositions the storage medium.

For readout, the storage medium 48 is scanned using an unblanked and less intense focused electron beam, e.g., about 2-3 KeV. The recorded pattern of pits, or absence of pits, in the surface of the storage medium 48 causes electrons 54, as seen in FIG. 2, to be reflected from the surface of the storage medium 48. The reflected electrons 54 are detected by electron detector 34, which provides a signal 62 to amplifier 36. The amplified signal 64 is passed from amplifier 36 to the central control unit 42 which comprises means for separating data from the amplified signal and outputting such data by way of output data bus 66.

The storage medium 48 of the present invention provides a relatively permanent and low cost solution to the problem of storage of vast quantities of data. Implantation of the surface layer of the polymer film 56 with heavy metal ions 58 increases the thermal conductivity of such surface layer, allowing a rapid increase in the temperature in the surface layer to a point where permanent change occurs in the material, i.e., cratering or pitting, when the storage medium is written to by the focused electron beam. Since the polymer film has a low thermal conductivity, the absorbed beam energy is contained in a small volume comparable to the desired pit spacing.

Another advantage of the storage medium 48 of this invention is that greater power electron beams can be used, it being generally easier of focus higher voltage electron beams. The implanted heavy metal ions 58 increase the mass density of the surface layer of film 56. Since the electron range varies as about the 1.75 power of the beam voltage, a factor of 2 increase in mass density would permit a factor of $(2)^{1.75}$ or 3.3 increase in the beam energy, without increasing the size of the heated region. Hence, the absorbed power would increase by 3.3. Since, as noted above, it is in general easier to focus higher voltage electron beams, the net gain in power would likely be even larger.

The storage medium 48 may be in the form of a relatively thin sheet of polymeric material having a thickness in the range of about 0.005 to 0.025 inch, or thicker. Alternatively, the polymeric storage medium may be in the form of an elongated sheet which may be rolled onto a reel. For greater planar stability the polymeric material may be coated onto a glass plate, or other stable material.

Reasonable modifications are possible within the scope of this disclosure without departing from the scope and spirit thereof.

We claim:

1. A beam addressed memory system for digital memory recording and reading which comprises electron beam generating and focusing means, electron detecting means, a data storage medium, means for positioning said storage medium, a vacuum chamber, and electronic control and interface circuit means, wherein said data storage medium consists essentially of a crosslinkable polymeric film having an implanted surface layer of heavy metal ions.

2. The system of claim 1 wherein said polymeric film is polymethylmethacrylate.

3. The system of claim 1 wherein said metal ions have a density of at least 10 g/cc.

4. The system of claim 3 wherein said metal ions have a density of at least 15 g/cc.

5. The system of claim 4 wherein said metal ions have a density of at least 19 g/cc.

6. The system of claim 3 wherein said metal is selected from the group consisting of Au, Pt, Ir, Os, W, and Mo.

7. The system of claim 2 wherein said metal ions are implanted to fluences between $10^{16}$ and $10^{18}$ ions per square centimeter.

8. The system of claim 2 wherein said implanted surface layer has a thickness in the range of 0.05 to 0.5 microns.

* * * * *